United States Patent Office 3,159,605
Patented Dec. 1, 1964

3,159,605
**URETHANE POLYMERS FROM POLYHALOMETH-
ANEPHOSPHONATES AND ORGANIC POLYISO-
CYANATES**
Lester Friedman, Beachwood, Ohio, assignor, by mesne
assignments, to Union Carbide Corporation, a corporation of New York
No Drawing. Original application Dec. 8, 1961, Ser. No. 158,168. Divided and this application May 18, 1964,
Ser. No. 368,331
10 Claims. (Cl. 260—77.5)

This application is a division of application Serial No. 158,168, filed December 8, 1961.

This invention relates to phosphonates and polyurethanes made therefrom.

It is an object of the present invention to prepare novel halogen containing phosphonates.

Another object is to prepare polyurethanes from these phosphonates.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by reacting (1) a member of the group consisting of tris polyalkylene glycol phosphites and compounds having the formula

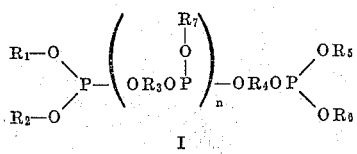

I where $R_1$, $R_2$, $R_5$, $R_6$ and $R_7$ are residues of polypropylene glycol, polyethylene glycol, polytetramethylene glycol or other polyalkylene glycol from which one of the hydroxyl groups has been removed; $R_3$ and $R_4$ are the residues of polyethylene glycol, polypropylene glycol, polytetramethylene glycol or other polyalkylene glycol from which the two hydroxyl groups have been removed and $n$ is zero or an integer, with (2) a compound having the formula

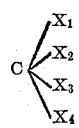

where at least three of $X_1$, $X_2$, $X_3$ and $X_4$ are halogen of atomic weight 35 to 80 and the other member of $X_1$, $X_2$, $X_3$ and $X_4$ is hydrogen or halogen of atomic weight 35 to 80, i.e., chlorine or bromine. Preferably, all of the X's are chlorine.

The phosphonates produced have one of the formulae noted below:

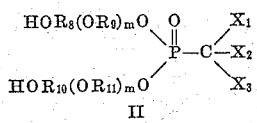

II where $R_8$, $R_9$, $R_{10}$ and $R_{11}$ are alkylene groups, $m$ is an integer of at least one and at least two of $X_1$, $X_2$ and $X_3$ are halogen of atomic weight 35 to 80 and the other member of $X_1$, $X_2$ and $X_3$ is halogen of atomic weight 35 to 80 or hydrogen; or one of the formulae

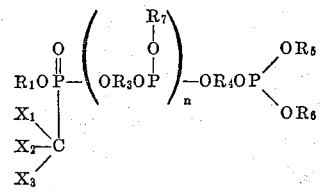

III

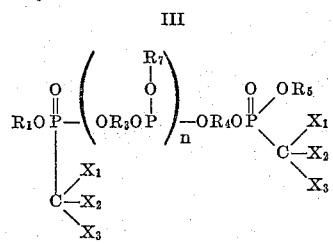

IV

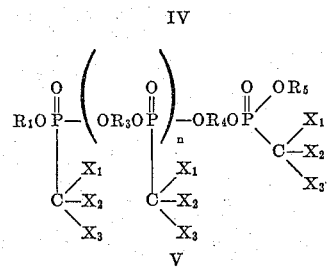

V where all of the R's, X's and $n$'s are defined as above.

If there is only one phosphorus atom in the starting molecule, even with an excess of carbon tetrahalide or haloform, only one phosphonate group will be formed. If more than one phosphorus atom is formed, then with equimolar amounts of phosphite and carbon tetrahalide or haloform, a monophosphonate will be formed. However, if an excess of the carbon tetrahalide or haloform is used, then more than one phosphite group will be converted to a phosphonate group to give the products of Formulae IV and V. The phosphonate products of the present invention are useful in polyester formulations and polyurethanes to impart fire retardance. They are compatible in urethane foam formulations. The polyurethane foams produced are useful as linings for textiles, insulation in building construction, upholstery filling material, carpet underlap, shock absorbing fillings for packages, etc.

The starting tris polyalkylene glycol phosphites for making the compounds of the present invention include tris dipropylene glycol phosphite, tris tripropylene glycol phosphite, tris polypropylene glycol 425 phosphite, tris polypropylene glycol 3000 phosphite, tris polypropylene glycol 1025 phosphite, tris polypropylene glycol 2025 phosphite, tris diethylene glycol phosphite, tris triethylene glycol phosphite and tris polyethylene glycol 2000 phosphite, and tris ditetramethylene glycol phosphite. Many of these compounds are disclosed in Friedman Patent 3,009,939, and the others can be made by the method of the Friedman patent by substituting the appropriate polyalkylene glycol for polypropylene glycol.

Among the starting phosphites within Formula I which can be employed are dipropylene glycol tetrol diphosphite, dipropylene glycol pentol triphosphite, tripropylene glycol tetrol diphosphite, polypropylene glycol 425 tetrol diphosphite, diethylene glycol tetrol diphosphite, diethylene glycol pentol triphosphite and ditetramethylene glycol tetrol diphosphite. The compounds within Formula I can be made as set forth in applications Serial No. 129,529, filed August 7, 1961, now Patent Number 3,081,334, and Serial No. 145,749, filed October 17, 1961, now Patent Number 3,142,651.

Since it is difficult to separate nonvolatile by-products when high molecular weight phosphites are employed, the preferred starting materials are tris dipropylene glycol phosphite, tris diethylene glycol phosphite, dipropylene glycol tetrol diphosphite and dipropylene glycol pentol triphosphite. The products from the polypropylene glycol phosphites frequently have better stability than the products from the polyethylene glycol phosphites and, hence, are preferred.

As the carbon tetrahalide or haloform there can be used carbon tetrachloride, carbon tetrabromide, chloroform or bromoform.

Typical examples of compounds within the present invention are bis dipropylene glycol trichloromethanephosphonate, bis diethylene glycol trichloromethanephosphonate, bis dipropylene glycol dichloromethanephosphonate, bis diethylene glycol dichloromethanephosphonate, bis dipropylene glycol tribromomethanephosphonate, bis tripropylene glycol trichloromethanephosphonate, bis dipropylene glycol dibromomethanephosphonate, bis polypropylene glycol 2025 trichloromethanephosphonate, dipropylene glycol triol phosphite trichloromethanephosphonate, diethylene glycol triol phosphite trichloromethanephosphonate, dipropylene glycol diol bis (trichloromethanephosphonate), dipropylene glycol phosphite dichloromethanephosphonate, dipropylene glycol tetrol diphosphite trichloromethanephosphonate, dipropylene glycol diol tris (trichloromethanephosphonate).

Unless otherwise indicated, all parts and percentages are by weight.

*Example 1*

96 grams (0.2 mol) of tris dipropylene glycol phosphite and 500 ml. (an excess) of carbon tetrachloride were heated under reflux until conversion appeared complete by infrared analysis. This took about 7 hours. Excess carbon tetrachloride was removed by distillation and the chloropropoxyisopropyl alcohol by-product was removed by stripping in vacuo. The residual liquid was bis dipropylene glycol trichloromethanephosphonate.

*Example 2*

The process of Example 1 was repeated replacing the tris dipropylene glycol phosphite with 0.2 mol of tris diethylene glycol phosphite to give as the liquid residue after removing volatiles bis diethylene glycol trichoromethanephosphonate.

*Example 3*

The process of Example 1 was repeated replacing the carbon tetrachloride with 500 ml. of carbon tetrabromide to produce dipropylene glycol tribromomethanephosphonate as the liquid residue.

*Example 4*

The process of Example 1 was repeated replacing the carbon tetrachloride with 500 ml. of chloroform to produce dipropylene glycol dichloromethanephosphate as the liquid residue.

*Example 5*

The process of Example 1 was repeated replacing the tris dipropylene glycol phosphite with 0.2 mol of dipropylene glycol tetrol diphosphite to produce dipropylene glycol diol bis (trichloromethanediphosphonate) as the liquid residue.

As previously indicated, the phosphonates of the present invention can be reacted with polyisocyanates to form polyurethanes. They can be the sole hydroxyl reactant present or they can be used in admixture with other polyhydroxy compounds (polyols) in forming the polyurethanes. Foamed polyurethanes can be obtained by adding water prior to or simultaneously with the addition of the polyisocyanate.

Alternately, foams can be made by uniformly distributing a liquefied fluorine containing haloalkane in either the phosphonate or polyisocyanate reactant and then mixing the reactants and permitting the temperature of the mixture to rise during the ensuing reaction above the boiling point of the liquefied gas, e.g., dichlorodifluoromethane.

Foamed polyurethanes can be made by either the one shot or two-step procedure. The polyurethanes prepared according to the invention are solids and can be used in the manner previously indicated.

The unfoamed polyurethanes can be molded into cups and other articles and used to form protective coatings on wood, steel or glass.

As examples of organic polyisocyanates which can be employed to make the polyurethanes there can be employed toluene 2,4-diisocyanate, toluene 2,6-diisocyanate, 4-methoxy-1,3-phenylene diisocyanate, diphenyl methane-4,4'-diisocyanate, 4,4'-methylene bis (phenylisocyanate), naphthalene, diisocyanate, hexamethylene diisocyanate, toluene-2,4,6-triisocyanate, the reaction product of toluene diisocyanate with trimethylolpropane at an NCO/OH ratio of 2:1, etc.

Alternatively, as the polyisocyanate there can be used a prepolymer made by reacting one of the above polyisocyanates with a polyhydroxy compound. Thus, there can be used prepolymers of toluene diisocyanate and castor oil, toluene diisocyanate and ethylene glycol-propylene glycol-adipate described in Kohrn Patent 2,953,839, Example I, toluene diisocyanate and polypropylene glycol 2025; toluene diisocyanate and LG-56 (glycerine-propylene oxide adduct having a molecular weight of 3000), etc.

Any of the prepolymers and polyisocyanates set forth in Friedman application Serial No. 145,749 can be used.

In the examples a mixture of 80% toluene-2,4-diisocyanate and 20% toluene-2,6-diisocyanate was used.

The polyol phosphonates of the present invention can be used in admixture with other polyhydroxy compounds in forming the polyurethanes. Examples of such compounds are polyethylene glycols having molecular weights of 400 to 3000, polypropylene glycols having molecular weight of 400 to 3000, ethylene glycol, propylene glycol, dipropylene glycol, diethylene glycol, 1,4-butanediol, glycerol, trimethylolpropane, glycerine-propylene oxide adducts of molecular weights 1000 and 3000, hexanetriol 1,2,6-propylene oxide adducts of molecular weights 750, 1500, 2400 and 4000, pentaerythritol-propylene oxide adduct of molecular weight 1000, castor oil, N,N,N',N'-tetrakis (2-hydroxyethyl) ethylene diamine, N,N,N',N'-tetrakis (2-hydroxypropyl)ethylene diamine (Quadrol), polyethylene adipate phthalate having free hydroxyl groups, tris dipropylene glycol phosphite, etc.

From 5 to 100% by weight of the hydroxyl compound can be the polyol phosphonate of the present invention.

In preparing the polyurethanes there can be used any of the conventional basic catalysts, e.g., N-methyl morpholine, N-ethyl morpholine, tributyl amine, 2-diethylaminoacetamide, Quadrol, N,N'-dimethylpiperazine, and sodium phenolate. There can also be used tin compounds such as stannous octoate, dibutyltin dilaurate, dibutyltin acetate, tributyltin laurate, dibutyltin ethoxide, octylstannoic acid, triphenyltin hydride, dibutyltin oxide, etc. There can be used any of the basic compounds and tin compounds set forth in Friedman application Serial No. 145,749.

Conventional surfactants can be added in the amount of 1% or less. The preferred surfactants are silicones, e.g., polydimethyl siloxanes having a viscosity of 3 to 100 centistokes, triethoxydimethyl polysiloxane molecular weight 850 copolymerized with a dimethoxypolyethylene glycol of molecular weight 750, as well as any of the other siloxanes disclosed in Hostettler French Patent 1,212,252.

In the following examples there was employed the formulation:

| | Grams |
|---|---|
| Water | 0.37 |
| Dibutyltin dilaurate | 0.07 |
| Polydimethyl siloxane (50 centistokes grade) | 0.12 |
| N-ethyl morpholine | 0.1 |

This mixture is designated in the following examples as Formulation A.

Example 6

The polyol used in Formulation A was a mixture of 1.5 grams of dipropylene glycol trichloromethanephosphonate and 7 grams of polypropylene glycol 2025. Upon addition of 5.2 grams of toluene diisocyanate there was produced a solid foam.

Example 7

The polyol used in Formulation A was a mixture of 1.67 grams of dipropylene glycol dichloromethanephosphonate and 7 grams of LG–56 (glycerol-propylene oxide adduct molecular weight 3000). Upon addition of 5.2 grams of toluene diisocyanate there was produced a solid foam.

Example 8

The polyol used in Formulation A was a mixture of 1.32 grams of diethylene glycol trichloromethanephosphonate and 7 grams of polypropylene glycol 2025. Upon addition of 5.2 grams of toluene diisocyanate there was produced a solid foam.

Example 9

Formulation A was used omitting the water and employing 2.85 grams of dipropylene glycol trichloromethanephosphonate. There was then added 5.2 grams of toluene diisocyanate and the mixture allowed to form a prepolymer. There was then added 0.37 ml. of water and a rigid foam was obtained which was cured at 110° C.

I claim:

1. A polyurethane comprising the reaction product of an organic polyisocyanate with a member of the group consisting of (1) phosphonates having the formulae

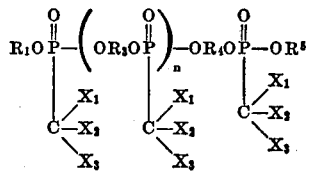

and wherein $R_1$, $R_2$, $R_5$, $R_6$ and $R_7$ are the residues of a polyalkylene glycol from which one of the hydroxyl hydrogens has been removed, $R_3$ and $R_4$ are the residues of a polyalkylene glycol from which the two hydroxyl groups have been removed, $R_8$, $R_9$, $R_{10}$ and $R_{11}$ are alkylene groups, $m$ is an integer of at least one, $n$ is selected from the group consisting of zero and an integer, $X_1$ and $X_2$ are halogen of atomic weight 35 to 80 and $X_3$ is selected from the group consisting of hydrogen and halogen of atomic weight 35 to 80.

2. A polyurethane comprising the reaction product of an organic polyisocyanate with a bis polyalkylene glycol polychloromethanephosphonate.

3. A polyurethane comprising the reaction product of an organic polyisocyanate with a bis dipropylene glycol polychloromethanephosphonate.

4. A polyurethane comprising the reaction product of an organic polyisocyanate with a bis dipropylene glycol trichloromethanephosphonate.

5. A polyurethane comprising the reaction product of an organic polyisocyanate with a bis diethylene glycol polychloromethanephosphonate.

6. A polyurethane comprising the reaction product of an organic polyisocyanate with a bis diethylene glycol trichloromethanephosphonate.

7. A polyurethane comprising the reaction product of an organic polyisocyanate with a dipropylene glycol polyol polychloromethanephosphonate compound having two phosphorus atoms and 2 to 3 hydroxyl groups, one of said phosphorus atoms being a part of a phosphite group when said compound has three hydroxyl groups and both of said phosphorus atoms being part of a phosphonate group in which the phosphorus is attached to a polychloromethane group when said compound has two hydroxyl groups.

8. A polyurethane according to claim 7 wherein all of the polychloromethane groups are trichloromethane groups.

9. A polyurethane comprising the reaction product of an organic polyisocyanate with a dipropylene glycol polyl polychloromethanephosphonate having three phosphorus atoms and 2 to 4 hydroxyl groups, any phosphorus atom which is not attached to a polychloromethane group being a part of a phosphite group attached to a dipropylene glycol group.

10. A polyurethane comprising the reaction product of an organic polyisocyanate with a polyalkylene glycol polyol polychloromethanephosphonate compound having two phosphorus atoms and 2 to 3 hydroxyl groups, one of said phosphorus atoms being a part of a phosphite group when said compound has three hydroxyl groups and both of said phosphorus atoms being part of a phosphonate group in which the phosphorus is attached to a polychloromethane group when said compound has two hydroxyl groups.

References Cited by the Examiner
UNITED STATES PATENTS

| 2,948,690 | 8/60 | Fox | 260—77.5 |
| 3,132,169 | 5/64 | Birum | 260—2.5 |

LEON J. BERCOVITZ, *Primary Examiner.*

DONALD E. CZAJA, *Examiner.*